US006623750B1

United States Patent
Cobb et al.

(10) Patent No.: US 6,623,750 B1
(45) Date of Patent: Sep. 23, 2003

(54) ENZYME COMPOSITION ADAPTED FOR APPLICATION TO RUMINANT FEED TO INCREASE PROTEIN DIGESTABILITY THEREOF AND METHOD OF TREATING RUMINANT FEEDS RELATING THERETO

(75) Inventors: Charles W. Cobb, Hereford, TX (US); James F. Tobey, Roanoke, VA (US)

(73) Assignees: Loveland Industries, Inc., Greeley, CO (US); George A. Jeffreys & Co., Inc., Salem, VA (US)

( * ) Notice: Subject to any disclaimer, the term of this patent is extended or adjusted under 35 U.S.C. 154(b) by 0 days.

(21) Appl. No.: 09/626,875

(22) Filed: Jul. 27, 2000

Related U.S. Application Data

(60) Provisional application No. 60/146,210, filed on Jul. 28, 1999, and provisional application No. 60/146,041, filed on Jul. 27, 1999.

(51) Int. Cl.$^7$ ................................................. A23K 1/18
(52) U.S. Cl. ...................... 424/438; 424/442; 424/94.1; 424/94.2; 424/94.61; 426/53; 435/267; 435/274; 435/275; 435/276; 435/277
(58) Field of Search ................................. 424/438, 442, 424/94.1, 94.2, 94.61; 426/2, 53, 71, 807, 635; 435/267, 274–277, 252.51, 252.4, 254.3, 254.6

(56) References Cited

U.S. PATENT DOCUMENTS 5,662,901 A 9/1997 Tobey, Jr. et al.
5,720,971 A 2/1998 Beauchemin et al.

OTHER PUBLICATIONS

"1999 Official Publication Association of American Feed Control Officials Incorporated", by Association of American Feed Control Officials, Copyright © 1999, pp. 207–217.

"Multicel 185", George A. Jeffreys and Company, Inc., published on or before Jan. 1, 2000.

"Material Safety Data—Multicel 185", Nugen, Inc., Mar. 1, 1994, pp. 1–4.

"Spezyme® CP", Genencor® Cellulase Enzyme, on or before Jan. 1, 2000.

"Effect of Cell Wall Degrading Enzyme Preparations on the In–Vitro N Solubility of Feedstuffs", J.W. Cone, A.H. Van Gelder and J. Van Der Meulen, Received Sep. 8, 1994, pp. 242–246, 248, 250 and 252.

(List continued on next page.)

Primary Examiner—Neil Levy
(74) Attorney, Agent, or Firm—Hogan & Hartson L.L.P.

(57) ABSTRACT

Enzyme feed supplements containing fungal cellulase produced by *Trichoderma viride* are specially adapted for increasing protein digestability of dairy cow and cattle feed. Preferred embodiments of the present invention include enzyme formulations adapted for application to corn and enzyme formulations adapted for application to grain sorghum, to which is added *Trichoderma viride* cellulase. An increase in protein digestability has been evidenced by increased protein content of milk and increased nitrogen retention from the feed.

10 Claims, 6 Drawing Sheets

OTHER PUBLICATIONS

*Food Carbohydrates*, Edited by David R. Lineback, Ph.D., Raleigh, North Carolina and George E. Inglett, Ph.D., Peoria, Illinois, AVI Publishing Company, Inc., Westport, Connecticut, "Analysis of Polysaccharides", pp. 356–360.

"Joint Proceedings of the Second International Roundtable on Animal Feed Biotechnology—Probiotics and Workshop on Animal Feed Enzymes", Edited by S.K. Ho, D.A. Leger, and E.E. Lister, Ottawa, Ontario, Canada, Feb. 3–4, 1994, "Are Enzymes Effective: Application to Monogastric Animals", pp. 149–184.

"Nutritional implications of feeding enzyme–treated wheat bran to pigs", by Johan Inborr, Jan Van Der Meulen and Jari Puhakka, on or before Jan. 1, 2000, pp. 3, 6 and 22.

"Probiotic Concepts: The Production and Use of Direct Fed Microbials and Enzyme Bearing Products in Animal Management", by James F. Tobey, Jr., 1992.

*Biotechnology In the Feed Industry: 1994 and Beyond*, T.P. Lyons, Alltech Inc., Nicholasville, KY,® 1994, pp. 83–85.

"Upgrading recycled pulps using enzymatic treatment", Gerhard Stork, Helena Pereira, Thomas M. Wood, Eva Maria Dusterhoft, Annette Toft, and Juergen Puls, vol. 78 No. 2 Tappi Journal 79, Feb. 1995, pp. 79, 82, 83 and 87.

"Feed Additive for Animal Use", Kyowa Hakko Kogyo Co Ltd, Konno Toshiyasu, Matsuura Ichiro and Shirahata Kimikatsu, Aug. 3, 1993, Abstract of JP05192093A.

Influence of Sodium Hyroxide and Enzyme Additions on Nutritive Values of Rice Straw, C.M. Wilis, O. T. Stallcup and D. L. Kreider, University of Arkansas, pp. 303–308, 1980.

ENZYME COMPOSITION ADAPTED FOR APPLICATION TO RUMINANT FEED TO INCREASE PROTEIN DIGESTABILITY THEREOF AND METHOD OF TREATING RUMINANT FEEDS RELATING THERETO

RELATED APPLICATION

The present application is a non-provisional filing claiming priority of U.S. patent application Ser. No. 60/146,041 filed Jul. 27, 1999 and U.S. patent application Ser. No. 60/146,210 filed Jul. 28, 1999. The present application contains subject matter which is related to the subject matter of U.S. Pat. No. 5,662,901 entitled ENZYMATIC GRAIN CONDITIONER AND METHODS OF USING IT, which, by this reference, is incorporated in its entirety herein.

FIELD OF THE INVENTION

The present invention relates to ruminant feed conditioners and modifiers and application techniques relating thereto. More particularly, the present invention relates to exogenous enzyme compositions adapted for treating ruminant feed to improve protein digestability and retention and decrease nitrogen-containing waste.

BACKGROUND OF THE INVENTION

As described in more detail in U.S. Pat. No. 5,662,901, the practice of applying products containing active enzymes to ruminants feed is known. In particular, such enzymes can be utilized to increase the food value of grains and feeds such as corn, grain sorghum, barley, rye and oats. Application of certain active enzymes to ruminant feed has been shown to increase carbohydrate availability and fiber digestability, which contribute to increased rate of weight gain and feed utilization efficiency.

Despite these improvements in feed utilization, pollution from nitrogen-containing waste, including waste containing nitrates and ammonia, continues to be an environmental problem associated in particular with cattle feedlots and dairy operations. Clearly, if one were able to cause ruminants to increase retention of the nitrogen content of feed, a concomitant decrease in nitrate and other nitrogen-containing waste would be expected to occur. Techniques for this purpose include hormonal supplements for ruminants, but such techniques are increasingly disfavored, in part due to the other possible health effects on individuals consuming meat products from the ruminants.

It can thus be seen that a need remains for a safe and economical technique which decreases production of nitrogen-containing wastes from ruminants. There also remains a need for techniques and compositions which increases protein content of milk from dairy cows and protein content of meat in cattle. It is therefore against the background described above that the advances of the present invention have been made.

SUMMARY OF THE INVENTION

The present invention relates to enzyme feed supplements containing fungal cellulase produced by Trichoderma viride which are specially adapted for increasing protein digestability of feed by dairy cow, cattle and other ruminants. Preferred embodiments of the present invention include enzyme formulations adapted for application to easier to digest grains such as corn, and enzyme formulations adapted for application to harder to digest grains, such as grain sorghum, to which are added Trichoderma viride cellulase enzyme. An increase in protein digestability has been evidenced by increased protein content of milk and increased nitrogen retention from the feed.

DETAILED DESCRIPTION

Figure 1:
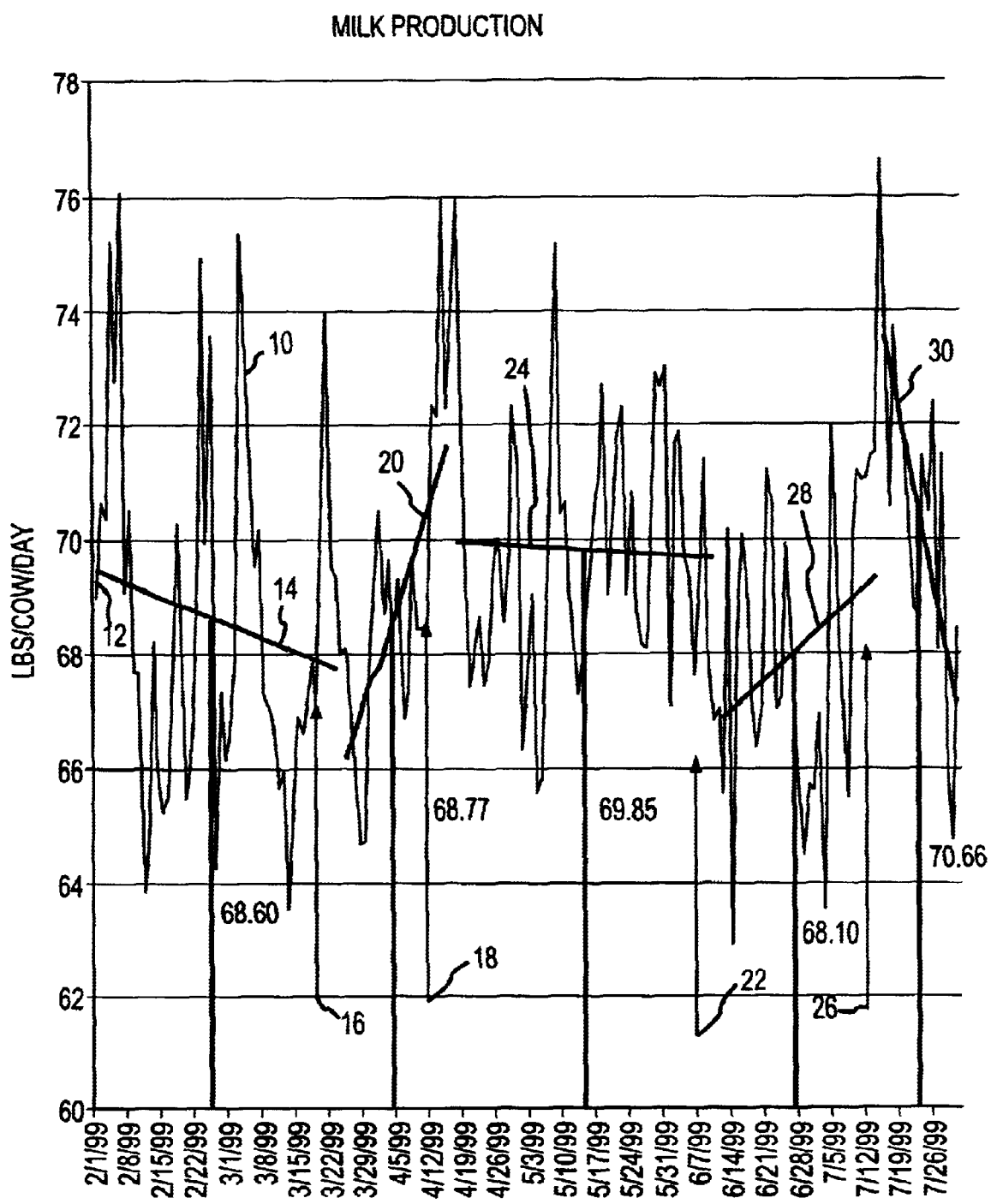
FIG. 1 is a graph showing total pounds per day of milk produced by dairy cows fed an enzyme composition of the present invention.

The present invention relates to enzyme feed supplements containing fungal cellulase produced by Trichoderma viride which are specially adapted for increasing protein digestability of feed ingested by dairy cows, cattle and other ruminants such as sheep, goats, bison, deer and the like. Preferred embodiments of the present invention include enzyme formulations adapted for application to easier to digest grains such as corn, and enzyme formulations adapted for application to harder to digest grains, such as grain sorghum, to which are added Trichoderma viride cellulase enzyme. An increase in protein digestability has been evidenced by increased milk protein production and increased nitrogen retention from the feed. This is unexpected because enzymes such as cellulase are generally polymer specific, with cellulase directly degrading cellulose, not protein. Furthermore, in vitro, even crude Trichoderma viride preparations tend to be active selectively on the hydrolysis of carbohydrates, including non-starch polysaccharides, not on polypeptides and proteins.

Generally, enzyme formulations of the present invention include exogenous Trichoderma viride cellulase enzyme, which, in addition to providing a broad-spectrum fibrolytic enzyme component, provides unexpected increases in total milk production and protein digestability of the ruminant feed. In one embodiment of the present invention, exogenous Trichoderma viride cellulase enzyme is applied to rations fed to dairy cows. Generally, an increase in total milk production is obtained and protein and total fat produced by these dairy cows is maintained or increased, as is described in Example I below.

EXAMPLE I

To establish baseline values of milk fat and protein content of milk obtained from a 1400 head of dairy herd, the herd was fed a control diet generally comprising total mixed ration with conventional supplementation from August 1 to 31, 1998 (1$^{st}$ Control Period). Milk fat and protein content measurements were made during the 1$^{st}$ Control Period, with average milk fat and protein contents summarized below in Table I. Baseline measurements were obtained during the period Sept. 1 to 18, 1998, with average milk fat and protein contents summarized below. The cows were then given feed treated with an enzyme composition comprising exogenous pectinase, beta-glucanase, amylase enzyme, hemicellulase and Trichoderma viride cellulase enzymes (see Cattle-Ase™

C formulation described below). The enzyme composition was applied at a rate of 185 grams of enzyme composition per ton of dry matter from Sept. 18 to 30, 1998 ($1^{st}$ Test Period). Average milk fat and protein content measurements for this period are summarized in Table I.; The cows were also given feed treated with the enzyme composition at an application rate of 185 grams of enzyme composition per ton of dry matter from Oct. 1 through 31, 1998 ($2^{nd}$ Test Period). Average milk fat and protein content for this period are also summarized in Table I below.

TABLE I

|  | $1^{st}$ Control Period | $2^{nd}$ Control Period | Weighted Avg. Control Periods | $1^{st}$ Test Period | $2^{nd}$ Test Period | Weighted Avg. Test Periods |
|---|---|---|---|---|---|---|
| Average Milk Fat Content % | 3.66% | 3.62% | 3.65% | 3.75% | 3.84% | 3.73% |
| Average Protein Content % | 3.09% | 3.13% | 3.10% | 3.20% | 3.25% | 3.24% |

On average, the average milk fat content of the milk produced by airy cows in the study ddescribed above increased measurably on a diet of feed pre-treated with an enzyme composition of the present invention, from 3.65% to 3.73%. On average, the protein content of the milk produced by dairy cows in the study described above also increased measurably on a diet of feed pre-treated with an enzyme composition of the present invention, from 3.10% to 3.24% on average.

EXAMPLE II

To further document increases in milk product obtained with enzyme compositions of the present invention adapted for application to dairy cow diets to increase total protein and/or milk production, a formulation from Loveland Industries, Inc. under the trademark Cattle-Ase™-HR which contained dried *Trichoderma viride* fermentation extract, water and propylene glycol with cellulase derived from *T. viride* present in at least 15,000 units per gram was fed to a herd of approximately 1700 dairy cows. Prior to the treatment, control periods were established in which the dairy cows feed was not treated with the enzyme formulation.

Figure 2:
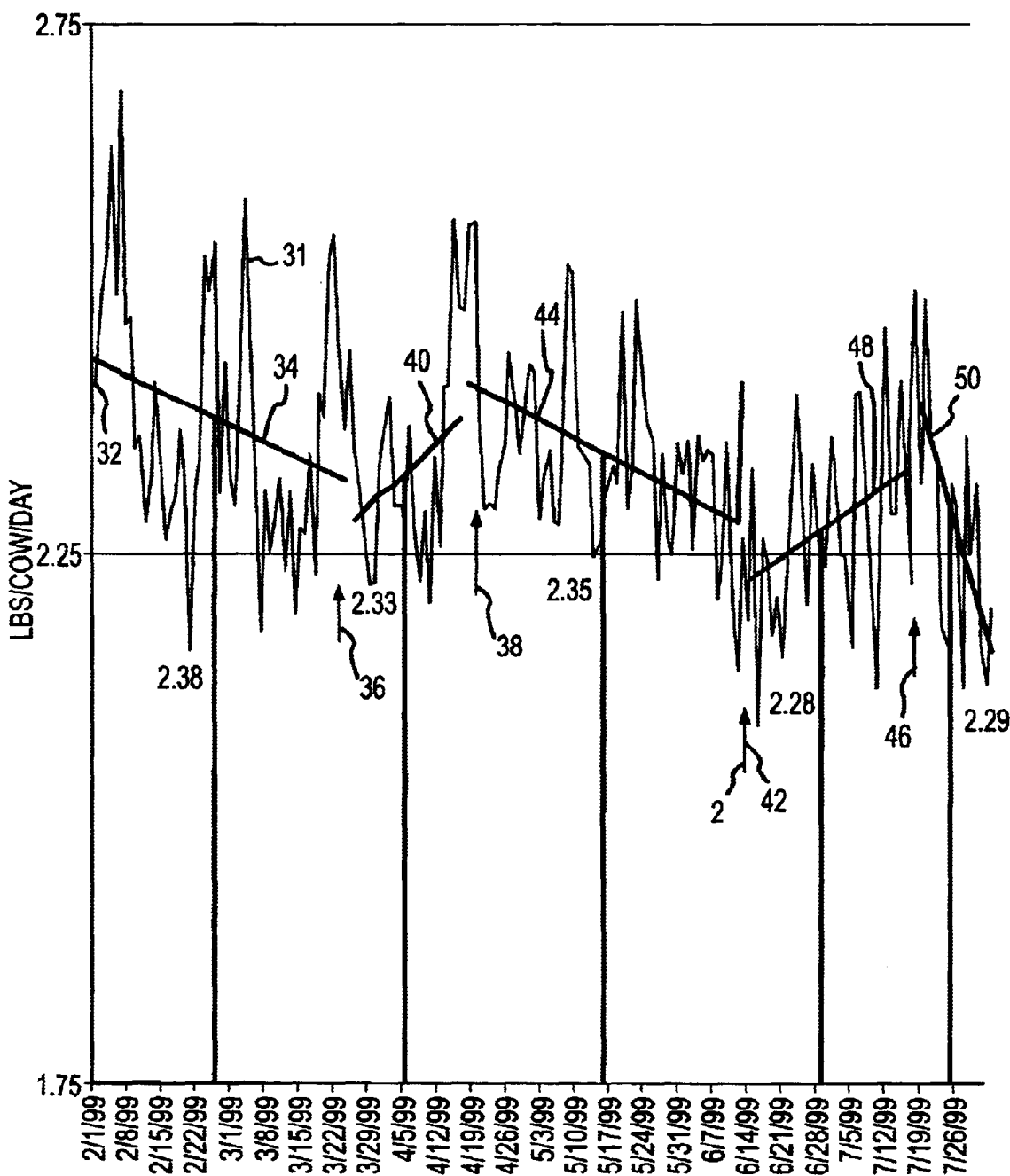
FIG. 2 is a graph showing total pounds of milk fat produced by dairy herd cows in the production tests illustrated in FIG. 1.
Figure 3:
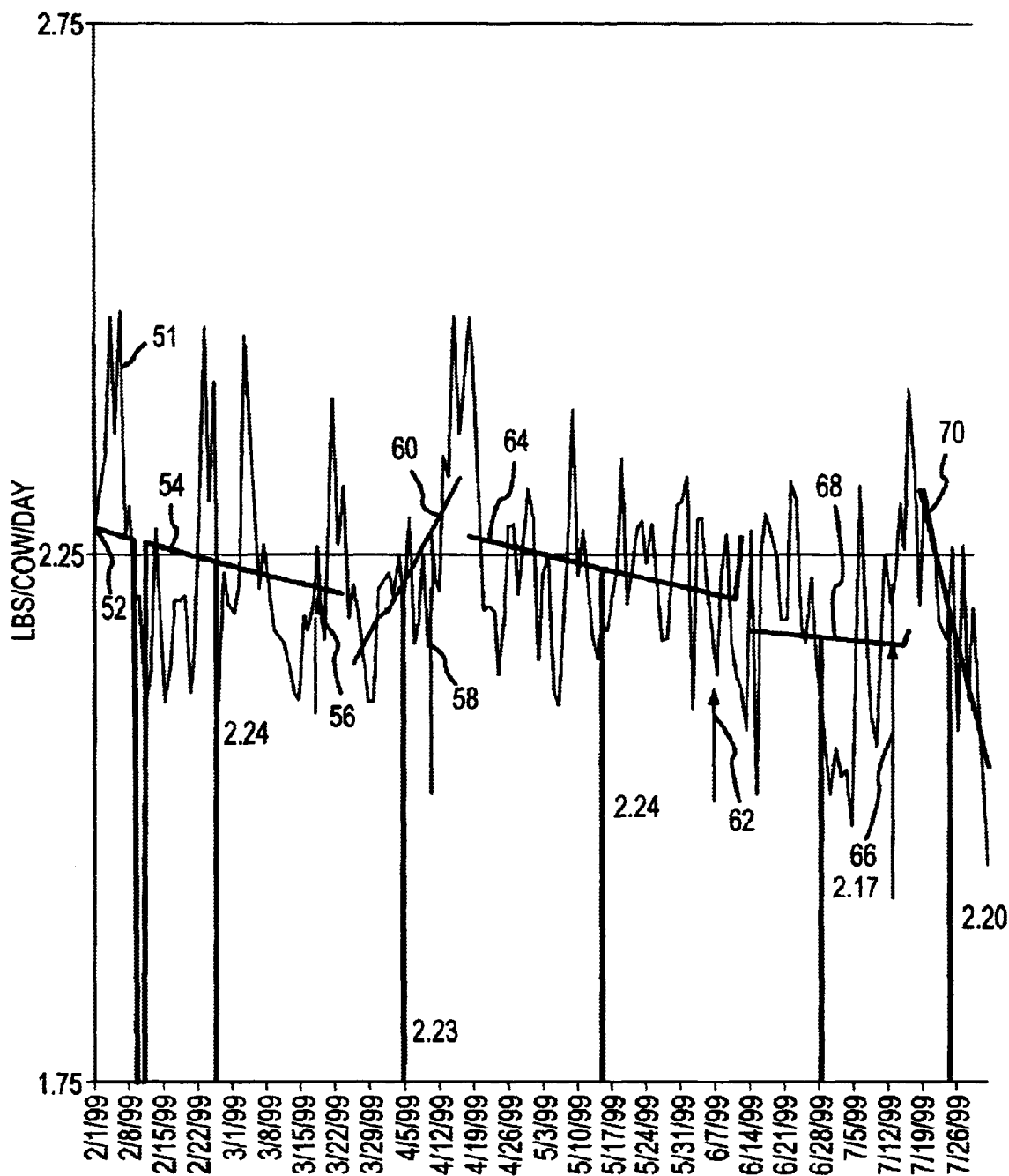
FIG. 3 is a graph showing total pounds of milk protein produced by dairy herd cows in the production tests illustrated in FIGS. 1 and 2.

Test results for this herd are detailed in FIGS. 1–3. Referring now to FIG. 1, the vertical (y) axis represents total pounds of milk produced per cow per day while the horizontal (x) axis represents time, in days, from Feb. 1, 1999 to Jul. 26, 1999. Trace 10 represents the total pounds of milk produced per cow at the point in time the milk was collected from the dairy for transport to the purchaser. Measurements began at Feb. 2, 1999 through Mar. 22,1999, the cows were fed a control diet containing no Cattle-Ase™-HR feed treatment ($1^{st}$ non-treatment period). Trend line 14 having a negative slope of −0.034 pounds of milk per cow per day indicates a steadily decreasing milk production during the $1^{st}$ non-treatment period. A $1^{st}$ enzyme treatment of the dairy cow feed stock then began on Mar. 23, 1999 (16) and continued through Apr. 15, 1999, when enzyme treatment ended (18). The trend line 20 indicates a steadily increasing milk production through the $1^{st}$ enzyme treatment period-the trend line having a positive slope of 0.273 pounds of milk per cow per day during this period. The $2^{nd}$ non-treatment period continued from Apr. 15, 1999 through Jun. 9, 1999, after which a $2^{nd}$ enzyme treatment began (22) on Jun. 10, 1999. Trend line 24 having a negative slope of −0.005 pounds of milk per cow per day indicates a somewhat flat period of milk production during the $2^{nd}$ non-treatment period. The $2^{nd}$ enzyme treatment ended Jul. 15, 1999 (26), after which a $3^{rd}$ non-treatment period began. The trend line 28 has a slope of 0.78 lb/milk/cow/day, which reflects an increase in milk production through the $2^{nd}$ enzyme treatment period. Trend line 30, having a negative slope of −0.430, indicates a steadily falling milk production after enzyme treatments stopped.

Referring now to FIG. 2, it can be seen that FIG. 2 is similar to FIG. 1, except that vertical (y) axis represents total milk fat produced per cow per day. Trace 31 represents the total pounds of milk fat produced per cow at the point in time the milk was collected from the dairy for transport to the purchaser. Trend line 34, which covers the $1^{st}$ non-treatment period (32) to (36) has a negative slope of −0.0022 pounds of milk fat per cow per day, indicative of a steadily decreasing milk fat production during the $1^{st}$ non-treatment period. Trend line 40, which covers the $1^{st}$ enzyme treatment period (36) to (38), has a positive slope of 0.0048 pounds of milk fat per cow per day during this period, reversing the previous trend of decreasing milk fat production. Trend line 44, which covers the $2^{nd}$ non-treatment period (38) to (42) has a negative slope of −0.0024, which is indicative of a steadily decreasing milk fat production during the $2^{nd}$ non-treatment period. Trend line 48, which covers the $2^{nd}$ enzyme treatment period (42) to (46), has a positive slope of 0.0033 pounds of milk fat per cow per day during this period, reversing the previous trend of decreasing milk fat production. Trend line 50, which covers the $3^{rd}$ non-treatment period beginning at (46) has a negative slope which is indicative of decreasing milk fat production.

Referring now to FIG. 3, it can be seen that FIG. 3 is similar to FIGS. 1 and 2, except that vertical (y) axis represents total milk protein produced per cow per day. Trace 51 represents the total pounds of milk protein produced per cow at the point in time the milk was collected from the dairy for transport to the purchaser. Trend line 54, which covers the $1^{st}$ non-treatment period (52) to (56) has a negative slope of −0.0012 pounds of milk protein per cow per day, indicative of a steadily decreasing milk protein production during the $1^{st}$ non-treatment period. Trend line 60, which covers the $1^{st}$ enzyme treatment period (56) to (58), has a positive slope of 0.0087 pounds of milk protein per cow per day during this period, reversing the previous trend of decreasing milk protein production. Trend line 64, which covers the $2^{nd}$ non-treatment period (58) to (62) has a negative slope of −0.0011, which is indicative of a slightly decreasing milk protein production during the $2^{nd}$ non-treatment period. Trend line 68, which covers the $2^{nd}$ enzyme treatment period (62) to (66), has a slope of close to zero (−0.0005 pounds of milk protein per cow per day during this period). Trend line 70, which covers the 3non-treatment period beginning at (66) has a negative slope of −0.0190 which is indicative of decreasing milk protein production.

EXAMPLE III

To further document increases in milk product obtained with enzyme compositions of the present invention adapted for application to dairy cow diets to increase total protein and/or milk production, a formulation from Loveland Industries, Inc. under the trademark Cattle-Ase™-C Dry Formula comprising exogenous pectinase, beta-glucanase, amylase enzyme, hemicellulase and *Trichoderma viride* cellulase enzymes (see Cattle-Ase™ C Dry Formula described below). was fed to a herd of approximately 2100 dairy cows. Prior to the treatment, a control period was established in which the dairy cows feed was not treated with the enzyme formulation.

Figure 4:
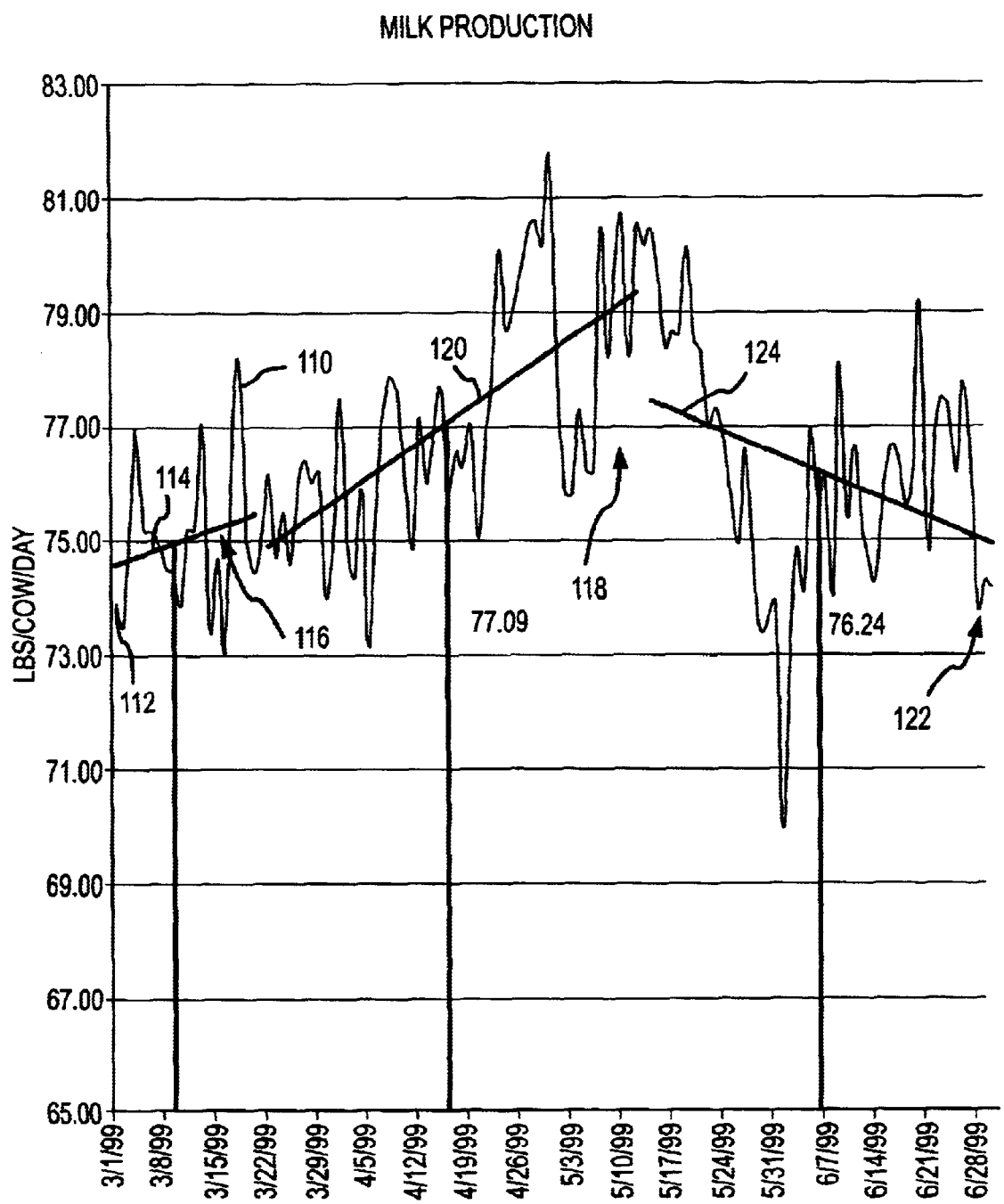
FIG. 4 is a graph illustrating total pounds per day of milk produced by dairy cows fed an enzyme composition of the present invention during a time period which was proceeded and followed by periods of eating feed not treated with such an enzyme treatment.
Figure 5:
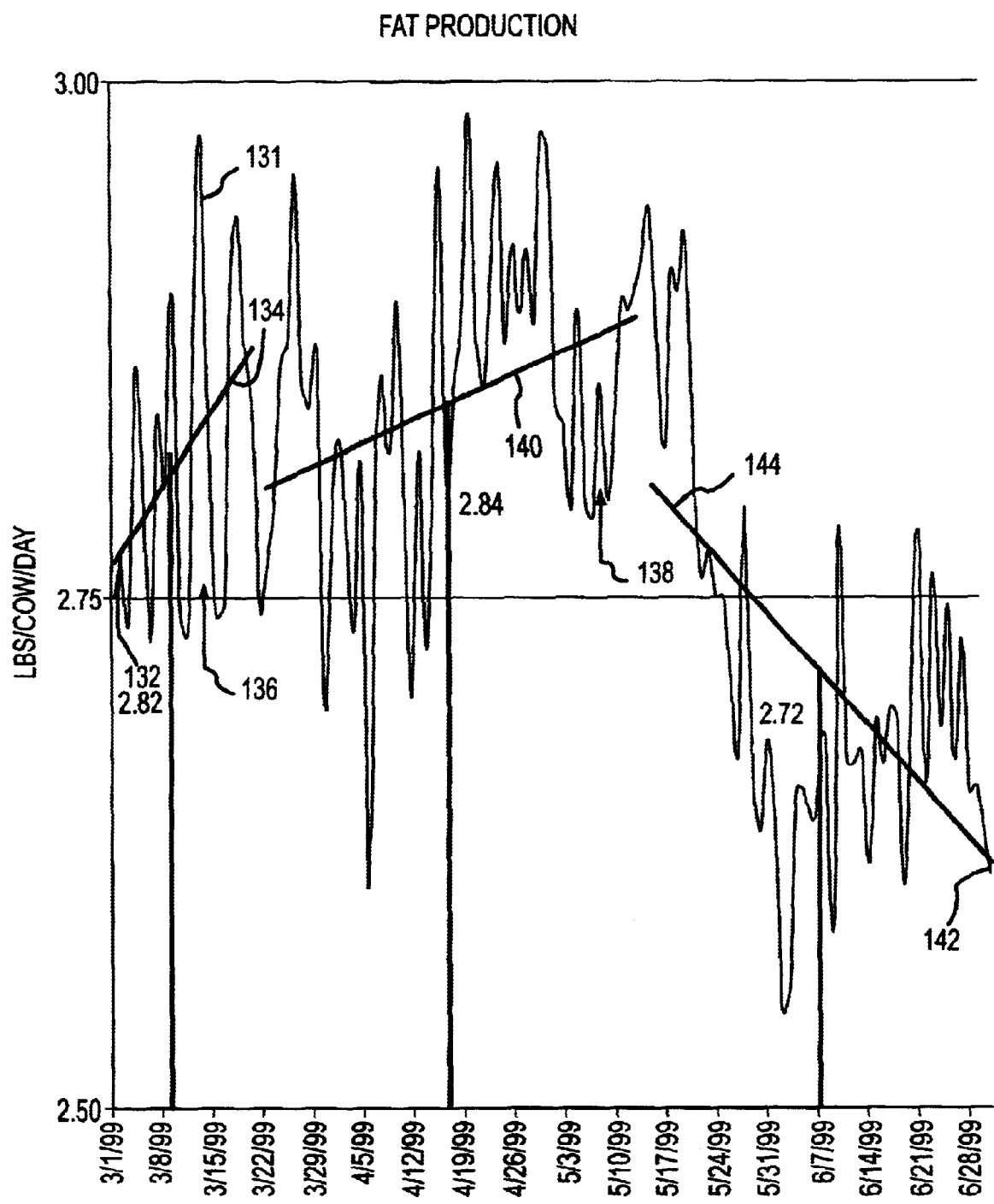
FIG. 5 is a graph showing total pounds of milk fat produced by dairy herd cows in the production tests of FIG. 4.
Figure 6:
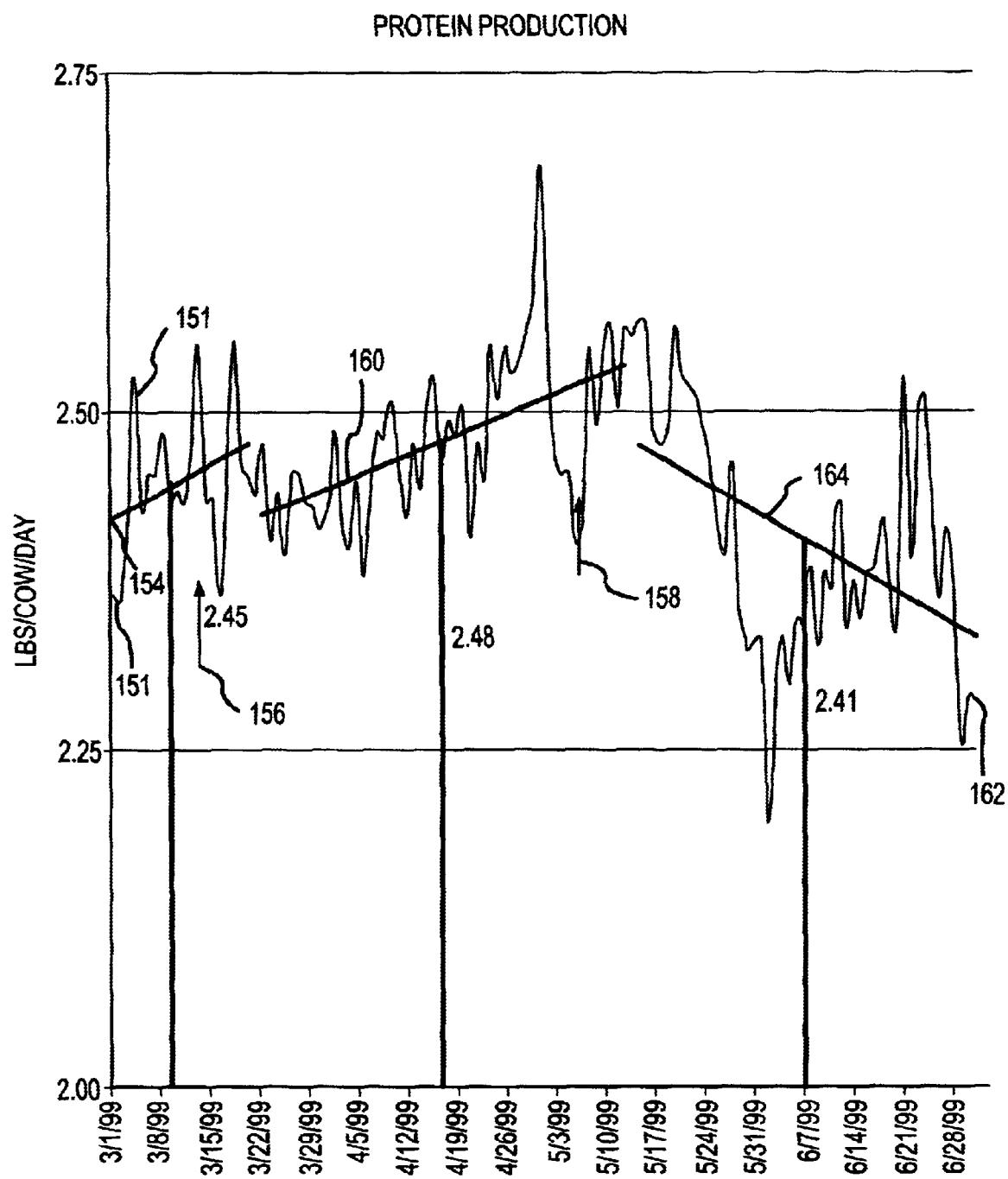
FIG. 6 is a graph showing total pounds of milk protein produced by dairy herd cows in the production tests of FIGS. 4 and 5.

Test results for this herd are detailed in FIGS. 4–6. Referring now to FIG. 4, the vertical (y) axis represents total pounds of milk produced per cow per day while the horizontal (x) axis represents time, in days, from March 1 to Jun. 28, 1999. Trace 110 represents the total pounds of milk produced per cow at the point in time the milk was collected from the dairy for transport to the purchaser. Measurements began at Mar. 1, 1999 (112) and continued through Mar. 19, 1999 (116) during which times the cows were fed a control diet containing no Cattle-Ase™-C ($1^{st}$ non-treatment period). Trend line 114 has a positive slope of 0.45 lb/milk/cow/day which indicates an increasing milk production during the $1^{st}$ non-treatment period. A $1^{st}$ enzyme treatment of the dairy cow feed stock then began on Mar. 20, 1999 (116) and continued through May 12, 1999, when enzyme treatment ended (118). The trend line 20 indicates total milk production increased through the $1^{st}$ enzyme treatment period at a steeper rate than that seen during the $1^{st}$ non-treatment period-trend line 20 having a positive slope of 0.087 lb/milk/cow/day during this period. The $1^{st}$ enzyme treatment period was followed by a $2^{nd}$ non-treatment period which ended when measurements stopped at Jun. 30, 2000. Trend line 124 has a negative slope of −0.053 lb/milk/cow/day indicates a period of overall decrease in milk production during the $2^{nd}$ non-treatment period.

Referring now to FIG. 5, it can be seen that FIG. 5 is similar to FIG. 4, except that vertical (y) axis represents total milk fat produced per cow per day. Trace 131 represents the total pounds of milk fat produced per cow at the point in time the milk was collected from the dairy. Trend line 134, which covers the $1^{st}$ non-treatment period (132) to (136) has a slope of 0.055 lb/milk fat/cow/day, indicates increasing milk fat production during the $1^{st}$ non-treatment period. Trend line 140 relating to the $1^{st}$ enzyme treatment period (136) to (138), has a positive slope of 0.0017 055 lb/milk fat/cow/day, which is less of an increasing rate than the previous non-treatment period. Trend line 144, which covers the $2^{nd}$ non-treatment period (138) to (142) has a negative slope of −0.0039, which is indicative of a steadily decreasing milk fat production during the $2^{nd}$ non-treatment period.

It can be seen that FIG. 6 is similar to FIGS. 4 and 5, except that vertical (y) axis represents total milk protein/cow/day. Trace 51 represents the total pounds of milk protein produced per cow at the point in time the milk was collected from the dairy for transport to the purchaser. Trend line 154, which covers the $1^{st}$ non-treatment period (152) to (156) has a positive slope of −0.0030 lb/milk protein/cow/day, indicative of a steadily increasing milk protein production during the $1^{st}$ non-treatment period. Trend line 160, which covers the $1^{st}$ enzyme treatment period (156) to (158), has a positive slope of 0.0022 lb/milk protein/cow/day during this period, which is somewhat similar to the total protein production during the $1^{st}$ non-treatment period. Trend line 164, which covers the $2^{nd}$ non-treatment period (158) to (162) has a negative slope of −0.0030, which is indicative of a decreasing milk protein production during the $2^{nd}$ non-treatment period.

EXAMPLE IV

Unexpected increases in nitrogen retention have been observed when treating rations feed to sheep with active *Trichoderma viride* cellulase enzyme. Twelve Rambouillet wethers, (average 6 months old and 64 lbs/ea.) were divided into four treatment groups and fed diets with either 10% or 20% chopped alfalfa hay, as described in Table II.

TABLE II

| Ingredient | 10% Alfalfa Hay Diet | 20% Alfalfa Hay Diet |
|---|---|---|
| Alfalfa hay, chopped | 10.00% | 20.00% |
| Corn, rolled | 69.19% | 59.49% |
| Soybean meal | 7.50% | 7.50% |
| Cottonseed meal | 5.75% | 5.75% |
| Molasses, liquid | 5.00% | 5.00% |
| Limestone, ground | 1.00% | 1.00% |
| Salt, plain | 0.50% | 0.50% |
| Ammonium chloride | 0.50% | 0.50% |
| Urea | 0.30% | — |
| Vitamin A, D & E premix | 0.26% | 0.26% |

Active *Trichoderma viride* cellulase enzyme in dry granular form was premixed with the ground corn and then mixed with the alfalfa portion of the diet at a rate of 28 grams per ton basis. After the $1^{st}$ collection period, diets were switched among groups so that no wether received its $1^{st}$ treatment. This design allowed a total of six animal observations per treatment. Dry matter digestibility, crude protein digestibility and nitrogen retained were all increased over the control in the rations containing with the enzyme addition for both the 10% and 20% alfalfa diets. Sheep metabolism measurements obtained are summarized in Table III below.

TABLE III

| | 10% Alfalfa Hay Diet | | 20% Alfalfa Hay Diet | |
|---|---|---|---|---|
| | Control | Cellulase Enzyme Treated Diet | Control | Cellulase Enzyme Treated Diet |
| dry matter digestibility % | $82.7^a$ | $87.1^b$ | $79.0^a$ | $85.5^b$ |
| crude protein digestability % | $77.7^a$ | $84.7^b$ | $76.2^a$ | $81.5^b$ |
| grams nitrogen N retained | $8.3^a$ | $11.4^b$ | $9.0^a$ | $12.1^b$ |

It should be understood that means in the same row within the same diet having different superscripts $^a$ and $^b$ differ. As can be seen from a review of Table II, and as expected, application of the *Trichoderma viride* cellulase enzyme to both the 10% and 20% alfalfa hay diets increased markedly the dry matter digestability of the feed in the sheep tested, as compared to sheep fed control diets. This is expected because enzymes such as cellulase are generally polymer specific, with cellulase directly degrading cellulose, a dry matter constituent. Unexpectedly, however, application of the *T. viride* cellulase enzyme to both the 10% and 20% alfalfa hay diets also increased markedly the crude protein digestability of the feed in the sheep tested and resulted in increased nitrogen retention, as compared to sheep fed control diets. These results were unexpected because it is the present understanding that cellulase does not directly degrade protein. It is believed by the inventors hereof that the increase in carbohydrate solubilization resulting to ingestion of *T. viride* cellulase, upon which rumen microbial population feed, thereby improving rumen protein degradation indirectly.

EXAMPLE V

One hundred and seventy-five (175) crossbred steers (604 lb.) were randomly divided by weight into five treatment groups with five pens of seven steers per treatment. The five treatments were: 1) cellulase liquid, 2) cellulase liquid+Digest C liquid (combination liquid), 3) control (no enzyme), 4) Digest C liquid and 5) cellulase dry+Digest C dry (combination dry). Steers were fed a steam flaked corn and alfalfa hay based diet on an ad Librium basis. The liquid form enzyme treatments were sprayed on the corn or hay components for each pen immediately prior to mixing the complete diet, while those in the dry form were mixed with ground corn and added to the diet via a premix. The study was divided into three (3) 56 day phases with alfalfa hay and corn at approximately 50:40, 30:60 and 10:80% for each respective phase. Each phase was summarized and analyzed as a separate experiment. A total of five (5) steers were not included in the data summaries—two (2) died, two (2) had leg or foot injuries and one (1) had foot rot. The cellulase enzyme was used at a rate of 5 ozs. per ton basis and Digest C at a rate of 6 ozs. per ton basis. Steers were weighed every 28 days and feed intake, average daily grain and feed:gain ratio were calculated on a pen basis for each 56 day phase.

Phase 1 (50% roughage diets). Dry intake was not different across treatments. However, steers receiving all enzyme treatment were more efficient and gained weight at a faster rate. This resulted from feeding a high roughage, backgrounding type diet support information gained from the in vitro studies and the sheep metabolism experiment, and suggest that steers fed this type of diet need supplemental enzymatic activity of the kind provided for optimal feed utilization. Improvements in average daily gain ranged from 10 to 23% while improvement in feed:gain ratio ranged from 14 to 19%.

Phase 2 (30% roughage diets). Steers were immediately switched from the 50% alfalfa hay diet to the 30% diet after the 56 day weighing. Dry matter intake increased about 2 lbs. per steer per day across all treatments as referenced from Phase 1, but were not different. Likewise, average daily gains and feed:gain ratios were not different across treatments. The average weight of steers at the end of the 56 day phase was 923 lbs. Thus, it is likely that roughage level in the diet was limiting net energy intake needed during this phase and consequently reduced the steer's energetic efficiency for gain.

Phase 3 (10% roughage diets. Steers were gradually switched from the 30% alfalfa hay diet to the 10% diet over a 7 day period, at which time all enzyme treatments were still being added on a diet component basis. Feed intake was higher for the control treatment as compared to all enzyme treatments during this phase. This indicates that steers receiving all enzyme treatment were meeting their net energy needs at a lower level of intake since average daily gains and feed to gain ratios were not different from the control. However, numerous improvements in average daily gain ranged from 8 to 10% while improvements in feed:gain ratio ranged from 1 to 5%.

Data for overall study across roughage levels (0–168 days) are presented in tabular form but were not statistically analyzed because there were distinct and biologically evident reasons for bias in doing such. General directions of the overall data indicate lower feed intake, higher average daily gain, and improved feed:gain ratio from enzyme addition from either cellulase, Digest C or the combination.

After slaughtering, a value calculated for carcasses was based on prices paid on Jun. 5, 1998, reflecting industry averages. Carcasses were sold on an industry standard grade and yield grid system which includes hot carcass weight, final yield grade and quality grade. Steers receiving the Digest C liquid treatment had larger ribeye areas than the control and the combination dry treatment. The cellulase liquid and the combination liquid treatments resulted in somewhat larger ribeye areas as compared to the control but were not different. All enzyme treatments resulted in somewhat heavier hot carcass weight but were not different from the control. There were no differences across final yield grades. However, distribution of carcasses across the four (4) quality grades favored the enzyme treatments. Overall, the carcass characteristics were informative and indicate that steers fed these enzymes may have carcasses that are somewhat different in composition.

A presently preferred formulation of an enzyme composition of the present invention adapted for application to easier to digest grains (such as corn) to be fed to cattle contains dried *Aspergilus niger* fermentation extract, dried *Bacillus subtili* fermentation extract, dried *Trichoderma viride* fermentation extract, dried *Aspergillus oryzae* fermentation extract and wheat bran such that alpha-amylase is present in at least 750 units per gram, total cellulase derived from *T. viride* and *A. niger* is present in at least 16,000 units per gram. Preferably, at least 185 grams of the formulation is applied to each ton of complete feed on a dry matter basis, or 200 grams per metric ton of complete feed on a dry matter basis. This formulation is presently available form Loveland Industries, Inc. under the trademark Cattle-Ase™-C Dry Formula.

Another presently preferred formulation of an enzyme composition of the present invention adapted for application to easier to digest grains (such as corn) to be fed to cattle contains dried *Aspergilus niger* fermentation extract, dried *Bacillus subtili* fermentation extract, dried *Trichoderma viride* fermentation extract, dried *Aspergillus oryzae* fermentation extract and propylene glycol such that alpha-amylase is present in at least 750 units per gram, total cellulase derived from *T. viride* and *A. niger* is present in at least 16,000 units per gram. Preferably, at least 185 grams of the formulation is applied to each ton of complete feed on a dry matter basis, or 200 grams per metric ton of complete feed on a dry matter basis. This formulation is presently available form Loveland Industries, Inc. under the trademark Cattle-Ase™-C.

Yet another presently preferred formulation of an enzyme composition of the present invention adapted for application to harder to digest grains (such as grain sorghum) to be fed to cattle contains dried *Aspergilus niger* fermentation extract, dried *Bacillus subtili* fermentation extract, dried *Trichoderma viride* fermentation extract, dried *Aspergillus oryzae* fermentation extract and propylene glycol such that beta-glucanase is present in at least 3.2 units per gram, total cellulase derived from *T. viride* and *A. niger* is present in at least 16,000 units per gram. Preferably, at least 185 grams of the formulation is applied to each ton of complete feed on a dry matter basis, or 200 grams per metric ton of complete feed on a dry matter basis. This formulation is marketed by Loveland Industries, Inc. under the trademark Cattle-Ase™-B.

A related dry formula is available from Loveland Industries, Inc. under the trademark Cattle-Ase™m-B Dry Formula. This formulation is adapted for application to harder to digest grains (such as grain sorghum) to be fed to cattle contains dried *Aspergilus niger* fermentation extract, dried *Bacillus subtili* fermentation extract, dried *Trichoderma viride* fermentation extract, dried *Aspergillus oryzae* fermentation extract and wheat bran such that beta-glucanase is present in at least 3.2 units per gram, total cellulase derived from *T. viride* and *A. niger* is present in at least 16,000 units per gram. Preferably, at least 185 grams of the formulation is applied to each ton of complete feed on a dry matter basis, or 200 grams per metric ton of complete feed on a dry matter basis.

Another presently preferred formulation of an enzyme composition of the present invention adapted for application to harder to digest grains (such as grain sorghum) to be fed to cattle contains dried *Aspergilus niger* fermentation extract, dried *Bacillus subtili* fermentation extract, dried *Trichoderma viride* fermentation extract, dried *Aspergillus oryzae* fermentation extract and propylene glycol such that beta-glucanase is present in at least 3.5 units per gram, total cellulase derived from *T. viride* and *A. niger* is present in at least 15,000 units per gram. Preferably, at least 185 grams of the formulation is applied to each ton of complete feed on a dry matter basis, or 200 grams per metric ton of complete feed on a dry matter basis. This formulation is marketed by Loveland Industries, Inc. under the trademark Cattle-Ase™-S.

A related dry formulation is available from Loveland Industries, Inc. under the trademark Cattle-Ase™-S Dry Formula. This formulation is also adapted for application to harder to digest grains (such as grain sorghum) to be fed to cattle contains dried *Aspergilus niger* fermentation extract, dried *Bacillus subtili* fermentation extract, dried *Trichoderma viride* fermentation extract, dried *Aspergillus oryzae* fermentation extract and wheat bran, such that beta-glucanase is present in at least 3.5 units per gram, total cellulase derived from *T. viride* and *A. niger* is present in at least 15,000 units per gram. Preferably, at least 185 grams of the formulation is applied to each ton of complete feed on a dry matter basis, or 200 grams per metric ton of complete feed on a dry matter basis.

Another presently preferred formulation of an enzyme composition of the present invention adapted for application to dairy cow diets to increase protein content of milk and/or increase milk production contains dried *Trichoderma viride* fermentation extract, water and propylene glycol such that cellulase derived from *T. viride* is present in at least 15,000 units per gram. Preferably, at least 185 grams of the formulation is applied to each ton of complete feed on a dry matter basis, or 200 grams per metric ton of complete feed on a dry matter basis. This formulation is marketed by Loveland Industries, Inc. under the trademark Cattle-Ase™-HR.

Another presently preferred formulation of an enzyme composition of the present invention adapted for application to dairy cow diets to increase protein content of milk and/or increase milk production contains dried *Trichoderma viride* fermentation extract and wheat bran, such that cellulase derived from *T. viride* is present in at least 15,000 units per gram. Preferably, at least 170 grams of the formulation is applied to each ton of complete feed on a dry matter basis, or 200 grams per metric ton of complete feed on a dry matter basis. This formulation is marketed by Loveland Industries, Inc. under the trademark Cattle-Ase™-HR Dry Formula.

It is believed that optimized nitrogen retention and increased protein digestability can be obtained with the different compositions of the present invention identified above, in a manner designed to impact complex feed energy sources. More particularly, enzyme components identified above supplement the natural enzymes in the rumen. In the case of cellulase, which is not detected in free form in the rumen, the soluble cellulase activity of the *T. viride* cellulase in the compositions of the present invention supplements the natural cellulosic function in the rumen which is membrane bound and is saturated at all times. All that is secreted is used, therefore, the added catalytic activity from the broad spectrum cellulase, beta-glucanases and other carbohydrases releases energy quickly and efficiently from cellulose and other more complex feed stuff forms. In this way, the compositions of the present invention help to eliminate a potentially rate limiting step in rumen metabolism, that being, the conversion of various fibers to intermediate compounds which feed functional rumen bacteria. Metabolism studies have validated these concepts by showing statistically significant increased values for dry matter digestibility, crude protein digestibility and nitrogen retention.

Currently, preferred embodiments of the present invention and many improvements have been described with a degree of particularity. It should be understood that the present invention is defined by the spirit and scope of the following claims.

What is claimed is:

1. A method of increasing protein digestibility of a grain in ruminants, comprising the steps of:

treating the grain with an exogenous pectinase enzyme;

treating the grain with an exogenous beta-glucanase enzyme;

treating the rain with an exogenous amylase enzyme;

treating the grain with an exogenous hemicellulase enzyme;

treating the grain with an exogenous *Trichoderma viride* cellulase enzyme; and feeding the treated grain to said ruminants, wherein the grain treatment steps are performed (a) sequentially in any order, (b) separately but concurrently, (c) by combining all of said enzymes prior to the treating steps, or d) by combining two or more of said enzymes prior to the treating steps.

2. The method of claim 1 wherein the grain includes corn.

3. The method of claim 1 wherein the ruminants comprise dairy cows.

4. The method of claim 1 wherein the ruminants comprise beef cattle.

5. A method of decreasing nitrogen-containing waste production from ruminants, comprising the step of:

feeding the ruminants a grain treated with exogenous pectinase, beta-glucanase, amylase, hemicellulase and *Trichoderma viride* cellulase enzymes.

6. A method of increasing protein digestibility of an easier-to-digest feed in ruminants, said method comprising:

providing an enzyme composition comprising exogenous alpha-amylase enzyme and exogenous cellulase enzyme and prepared from *Aspergillus niger* fermentation extract, *Bacillus subtili* fermentation extract, *Trichoderma viride* fermentation extract, and *Aspergillus oryzae* fermentation extract;

treating said feed with said composition; and feeding said treated feed to said ruminants.

7. The method of claim 6, wherein said alpha-amylase is present in at least 750 units per gram of said composition.

8. The method of claim 6, wherein said cellulase is present in at least 16,000 units per gram of said composition.

9. A method of increasing protein digestibility of a grain in ruminants, said method comprising:

providing an enzyme composition comprising exogenous cellulase enzyme and prepared from *Trichoderma viride* fermentation extract;

treating said grain with said composition; and feeding said treated grain to said ruminants.

10. The method of claim 9, wherein said cellulase is present in at least 15,000 units per gram of said composition.

* * * * *

UNITED STATES PATENT AND TRADEMARK OFFICE
CERTIFICATE OF CORRECTION

PATENT NO. : 6,623,750 B1  Page 1 of 1
DATED : September 23, 2003
INVENTOR(S) : Charles W. Cobb and James F. Tobey It is certified that error appears in the above-identified patent and that said Letters Patent is hereby corrected as shown below:

<u>Title page,</u>
Item [73], should read:
-- Assignees:  Loveland Industries, Inc., Greeley, CO (US);
 Novozymes A/S, Bagsvaerd, Denmark. --

Signed and Sealed this

Twenty-seventh Day of January, 2004

JON W. DUDAS
*Acting Director of the United States Patent and Trademark Office*